Feb. 25, 1958 H. C. CRAWFORD 2,824,728
AQUARIUM AERATOR
Filed Dec. 10, 1956

INVENTOR.
Herbert C. Crawford.
BY
Fishburn and Gold.
ATTORNEYS.

United States Patent Office 2,824,728
Patented Feb. 25, 1958

2,824,728

AQUARIUM AERATOR

Herbert C. Crawford, Grandview, Mo.

Application December 10, 1956, Serial No. 627,211

5 Claims. (Cl. 261—119)

This invention relates to aerators for aquariums, and more particularly to aerators for small fish aquariums for use in the home.

With small fish aquariums in homes the water becomes stale due to the oxygen being dissipated therefrom and the water also becomes polluted due to the feeding of the small animals such as fish and therefore requires changing of the water at frequent intervals.

The principal objects of the present invention are to provide an aerator for aquariums wherein the aerator is anchored to the bottom of the aquarium by a hook wherein the aerator may be released from the hook and raised and lowered at intervals to replenish the water with oxygen in the air to maintain the life of the small animals such as fish in the water without frequent change of the water, and to provide a device of this character simple and economical to manufacture.

Other objects of the present invention are to provide a stem or rod with a plurality of sections or members frictionally held thereon in adjusted spaced relation; to provide the sections with a plane top surface, the opposite side having sections therein forming cells or pockets for trapping the air and preventing the air from spilling out of the pockets; to provide the sections with an outer depending flange of a depth so that the pressure driving the water down out of the cells will offset the natural adhesion of the water to the underneath flat part of the cell; to provide the members with a center tube having a hub on one side of the section having grooves therein and an opening of slightly smaller diameter than the vertical rod so that the friction on the rod will hold the sections in spaced position thereon; and to provide a suction cup for engaging the bottom of the aquarium and having a hook for engaging the stem of the aerator for removably attaching the aerator to the hook and retaining the same near the bottom of the aquarium.

In accomplishing these and other objects of my invention, I have provided improved details of structure the preferred forms of which are illustrated in the accompanying drawings, wherein.

Figure 1:
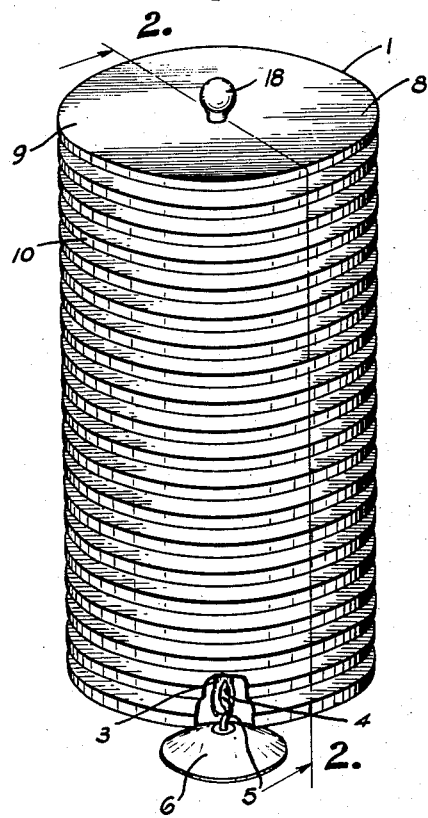
Fig. 1 is a perspective view of my invention with parts broken away to illustrate the hook engaging the eye of the center rod.
Figure 2:
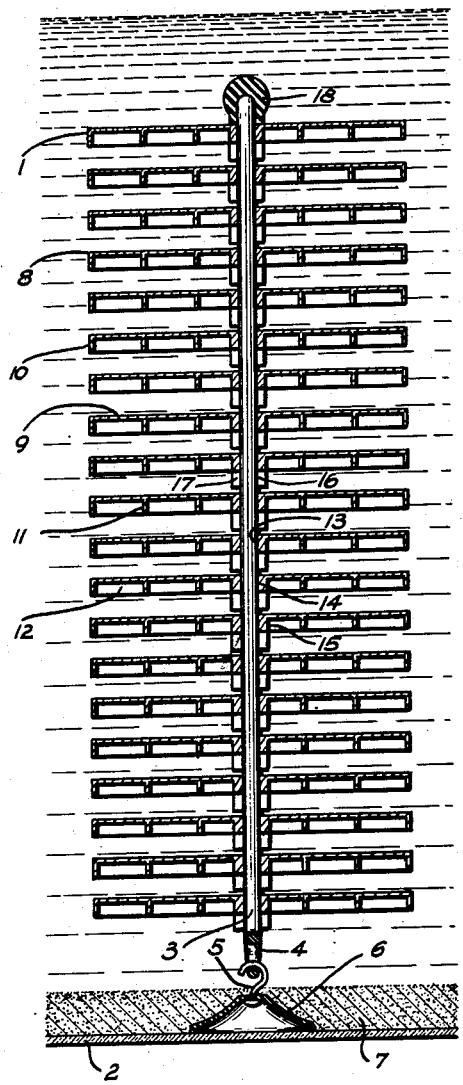
Fig. 2 is a cross-sectional view taken on a line 2—2, Fig. 1.

Referring more in detail to the drawings:

1 designates an aerator embodying the features of my invention adapted to be installed in an aquarium having a bottom 2 as illustrated in Fig. 2. The aerator includes a rod 3 having an eye 4 on the bottom thereof adapted to be engaged by a hook 5 on a suction cup or the like 6 which engages the bottom 2 of the aquarium in which there is usually a layer of sand or other material as indicated at 7 (Fig. 2). The eye 4 may be formed by providing the lower end of the rod 3 with an opening or by bending the lower end upwardly and inwardly to form the eye 4.

Adapted to engage vertically on the rod 3 is a plurality of section members 8 having a plane top surface 9 and having a depending flange 10 and a plurality of transverse cross flanges or partitions 11 forming pockets or cells 12 on the underneath side of the section members. Each section member is provided at substantially the center thereof with an opening 13. Surrounding the opening and integrally formed therewith is a tubular member 14 forming a tubular boss 15 having notches 16 and 17 in the respective sides thereof to provide a spring tension on the rod 3 when the members are placed on the rod for adjusting the sections vertically on the rod 3 and retaining them in place thereon. A removable knob 18 is placed over the upper end of the rod 3 above the uppermost section member 8 to serve as an ornament and grip for removing the aerator from the aquarium.

The size of each cell or pocket 12 is of importance. The lateral dimension of each cell should be just small enough to allow the adhesion of water to the partitions to make the air relatively immovable to small changes of direction of force of gravity in relation to the aerator units or sections 8. The depth of the partitions is to prevent air from spilling out of the pockets and to add more air surface to the water because of curvature made by adhesion of water to the partition, as illustrated in Fig. 3.

It will be obvious that the aerator must be removed from the water periodically to allow fresh air to enter into the cells or pockets 12. The aerator is of light weight and buoyant so that it will stay afloat for a substantial length of time. The oxygen in the air will be dissolved fairly rapidly, however, the nitrogen will be dissolved very slowly. The more surface for the adhesion of the water the more oxygen will be maintained in the pockets.

Figure 3:
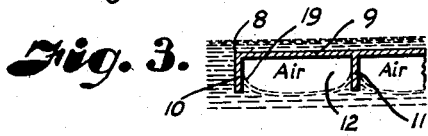
Fig. 3 is an enlarged fragmentary view particularly illustrating the air pocketed in the cells by the water.
Figure 4:
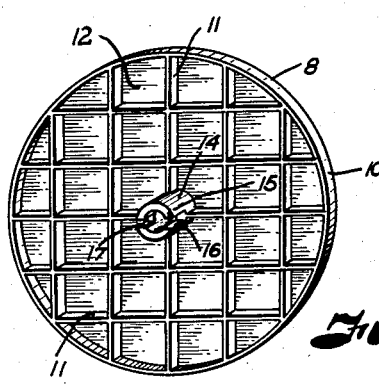
Fig. 4 is a bottom view of one of the section members of the aerator.

Figure 3 illustrates the action of the water in the cells. The water moves upwardly along the edge of the depending partitions as indicated at 19 while the water at the center of the cell remains at a level substantially equal to that on the outside of the aerator, thus providing more adherence of the water to the aerator.

I have found that a plastic or transparent material is suitable for my purpose in making the sections. Any light material such as aluminum, stainless steel or the like may be used without departing from the spirit of my invention but it must be of a character that has a buoyancy to float in the water.

It will be obvious from the foregoing that I have provided an improved aerator for small aquariums which will be quickly and easily assembled and detachable from the aquarium for raising and lowering to admit fresh air to the air pockets thereof.

What I claim and desire to secure by Letters Patent is:

1. An aerator for aquariums having a bottom and a supply of water therein comprising, a rod, a plurality of members adjustably spaced vertically on said rod, said members having a plate portion with a plane upper surface and a depending flange around its outer periphery and a plurality of parallel flanges extending across the under surface of said member in one direction and a plurality of parallel flanges extending across the under surface of said member in another direction, said flanges being integral with the plate member and depending from said under surface, said depending flanges being perpendicular to the plate portion and terminating in lower edges which are co-planar and in a horizontal plane forming a plurality of cells therein whereby the water will trap air in said cells when the aerator is immersed in the water, said flanges and plate portion being impervious to water, and interengaging means on the lower end of the rod and on the bottom of the aquarium for retaining the aerator immersed in the water.

2. An aerator for aquariums having a bottom and a supply of water therein comprising, a rod having an eye on its lower end, a plurality of members adjustably spaced vertically on said rod, said members having a plate portion with a plane upper surface and a depending flange around its outer periphery and a plurality of parallel flanges extending across the under surface of said member in one direction and a plurality of parallel flanges extending across the under surface of said member in another direction, said flanges being integral with the plate member and depending from said under surface, said depending flanges being perpendicular to the plate portion and terminating in lower edges which are coplanar and in a horizontal plane forming a plurality of cells therein whereby the water will trap air in said cells when the aerator is immersed in the water, said flanges and plate portion being impervious to water, and means on the bottom of the aquarium for engaging the eye on said rod for retaining the aerator immersed in the water.

3. An aerator for aquariums having a bottom and a supply of water therein comprising, a rod having an eye on its lower end, a plurality of pocket forming members on said rod, said members having a plane upper surface provided with a central opening, a tubular member secured in said opening and extending from the underneath side of said member, the free end of the tubular member being bifurcated to exert friction tension on said rod to hold said members in spaced vertical position on said rod, said members having a depending flange around their outer periphery and a plurality of transversely extending depending flanges on their under surface forming a plurality of pockets therein whereby the water will trap air in said pockets when the aerator is immersed in the water, and means on the bottom of the aquarium for engaging the eye on said rod for retaining the aerator immersed in the water.

4. An aerator for aquariums having a bottom and a supply of water therein comprising, a rod, a plurality of pocket forming members on said rod, said members having a plane upper surface provided with a central opening, a tubular member secured in said opening and extending from the underneath side of said member, the free end of the tubular member being bifurcated to exert friction tension on said rod to hold said members in spaced vertical position on said rod, said members having a depending flange around their outer periphery and a plurality of transversely extending depending flanges on their under surface forming a plurality of pockets therein whereby the water will trap air in said pockets when the aerator is immersed in the water, and means on the lower end of the rod cooperating with means on the bottom of the aquarium for retaining the aerator immersed in the water.

5. An aerator for aquariums having a bottom and a supply of water therein comprising, a rod, a plurality of pocket forming members on said rod, said members having a plane upper surface provided with a central opening, a tubular member secured in said opening and extending from the underneath side of said member, the free end of the tubular member being bifurcated to exert friction tension on said rod to hold said members in spaced vertical position on said rod, said members having a depending flange around their outer periphery and a plurality of transversely extending depending partitions on their under surface forming a plurality of pockets therein whereby the water will adhere to the surface of said partitions to trap air in said pockets when the aerator is immersed in the water, and means on the bottom of the aquarium cooperating with means on said rod for removably attaching said rod to said bottom for retaining the aerator immersed in the water and for ready detachment for raising and lowering to admit fresh air to said pockets when the oxygen has been dissipated.

References Cited in the file of this patent

UNITED STATES PATENTS

| | | |
|---|---|---|
| 1,407,258 | Connors | Feb. 21, 1922 |
| 1,451,925 | Ruff | Apr. 17, 1923 |
| 1,600,951 | Scott et al. | Sept. 21, 1926 |
| 2,020,536 | Cox | Nov. 12, 1935 |

FOREIGN PATENTS

| | | |
|---|---|---|
| 48,277 | Germany | Aug. 28, 1889 |